(12) United States Patent
Beaulieu

(10) Patent No.: US 8,556,208 B2
(45) Date of Patent: Oct. 15, 2013

(54) COMPONENT FOR BICYCLE FRAME

(75) Inventor: Cyril Beaulieu, La Tour-de-Treme (CH)

(73) Assignee: Scott Sports SA, Givisiez (CH)

( * ) Notice: Subject to any disclaimer, the term of this patent is extended or adjusted under 35 U.S.C. 154(b) by 277 days.

(21) Appl. No.: 12/953,015

(22) Filed: Nov. 23, 2010

(65) Prior Publication Data

US 2011/0121539 A1    May 26, 2011

(30) Foreign Application Priority Data

Nov. 24, 2009    (DE) .......................... 10 2009 054 398

(51) Int. Cl.
*B62K 19/02*    (2006.01)
(52) U.S. Cl.
USPC .......................................... 244/37; 280/281.1
(58) Field of Classification Search
USPC .......................................... 280/281.1; 244/37
See application file for complete search history.

(56) References Cited

U.S. PATENT DOCUMENTS

| 4,411,443 | A  | * | 10/1983 | Pollard .................... 280/288.1 |
| 4,659,940 | A  | * | 4/1987  | Shepard ......................... 290/55 |
| 5,246,275 | A  | * | 9/1993  | Arredondo, Jr. .......... 301/64.705 |
| 7,967,315 | B2 | * | 6/2011  | Soucek et al. ................ 280/274 |
| 2010/0225090 | A1 | * | 9/2010  | Cusack et al. ............. 280/281.1 |
| 2010/0253038 | A1 | * | 10/2010 | Soucek et al. ................ 280/274 |
| 2011/0064579 | A1 | * | 3/2011  | Thomas et al. ........... 416/146 R |

FOREIGN PATENT DOCUMENTS

| EP | 0307410 B1 | 12/1992 |
| EP | 1886906 A1 | 2/2008 |

OTHER PUBLICATIONS

Pooch, A., "Die Wissenschaft vom schnellen Radfahren II," Liegerad-Datei-Verlag, Nov. 2008, pp. 35-37 and 92-93.

* cited by examiner

*Primary Examiner* — Kevin Hurley
(74) *Attorney, Agent, or Firm* — Pepper Hamilton LLP

(57) ABSTRACT

The invention relates to a component (1) for a bicycle frame having a wing profile front side portion (2) and a back side portion (3) that is convex at least in certain portions. The invention further relates to a bottle holder (10) which is attachable to the component (1) or is configured in one piece with the component (1).

25 Claims, 3 Drawing Sheets

COMPONENT FOR BICYCLE FRAME

This application claims priority to German Application No. 10 2009 054 398.8, entitled Component For Bicycle Frame, filed on Nov. 24, 2009 which is hereby incorporated by reference in its entirety.

TECHNOLOGY FIELD

This invention relates to a component for a bicycle frame with high aerodynamic efficiency. The invention further relates to such a component with a bottle holder.

BACKGROUND

A bicycle frame comprises components such as down tube, top tube, head tube, seat tube, chain stay and seat stay, which are also designated frame components. The bicycle frame may be configured in one piece or, for example in the case of fully suspended bicycles, comprise a joint which rotatably interconnects the various frame components. Components for the purposes of the following print are not only frame components, however, but also components intended for mounting on such a bicycle frame, for example handlebars or a part of handlebars, for example a handlebar cross-brace, a seat post or a front fork or parts thereof such as the fork legs. The bicycle frame can be intended for bicycles with different purposes, such as a competition bicycle, a racing bicycle, a time trial bicycle, a mountain bike, an electric bicycle or a pedelec.

Such components are supporting components which fulfill a supporting function on the bicycle frame. For this purpose, such components must meet certain strength requirements, in particular with regard to flexural, buckling and torsional stiffness. For example, flexural stiffness depends on the square moment of inertia of the component into which there enters the cube of the dimension of the component in whose direction the flexural stiffness is being viewed. The strength requirements thus determine the minimum dimensions of the component, such as width and depth. If the component must have for example a higher strength perpendicular to the travel direction than in the travel direction of the bicycle, the resulting component having the minimum dimensions corresponding to the strength requirements has a greater dimension perpendicular to the travel direction than in the travel direction. Such a component has a low weight, but it possesses only low aerodynamic efficiency. For example, down tubes with a width of 52 mm and a depth of 46 mm are known.

For improving aerodynamic efficiency it is known to configure components in the form of wing profiles. Such wing profiles have been standardized by NACA (National Advisory Committee for Aeronautics) and are completely described for example by four-digit code numbers. Such wing profiles are employed in asymmetrical configuration as airplane wings. For use in bicycle frames there play a role substantially only symmetrical wing profiles which have no camber. Hence, the first two code numbers of four-digit NACA profiles are zero. The last two code numbers describe the profile thickness as a percentage of the profile depth, i.e. the maximum width of the profile based on the length of the chord line connecting the leading edge to the trailing edge. The rearward point of maximum thickness in four-digit NACA profiles is 30%, i.e. the maximum width of the profile is at 30% of the profile depth measured from the leading edge along the chord line. Such wing profiles are often employed for the down tube, the seat tube and the head tube of time trial bicycles.

Further, the International Cycling Union (Union Cycliste Internationale, UCI) regulates the configuration of components for frames of bicycles which may be used for competitive purposes. For example, such a component may not exceed a maximum depth of 80 mm. Likewise, such a component must have a minimum width of 25 mm. For seat stays, chain stays and fork legs the minimum width is 10 mm. Further, the ratio of depth to width of a tube may not exceed 3:1. In other words, the minimum width of a frame component is one third of its depth.

In view of the regulations of the International Cycling Union, there can thus be used for components within the meaning of the present print wing profiles with a relative profile thickness, based on the profile depth, of more than 33.3%, as is fulfilled for example by the NACA profile 0034 or four-digit NACA profiles with even higher values of the last two code numbers.

If there is located immediately behind a component a further bicycle part, it is further known to provide the component as a wing profile with a considerably smaller relative profile thickness, for example a NACA profile 0020, in which a part of the back area is absent. Because of the thereby reduced profile depth, such a component can also be configured according to the regulations of the International Cycling Union. Such a configuration of a frame component is known for example for the seat tube to which the back wheel is immediately adjacent. Additionally, the back of the seat tube can be configured concavely, so that the seat tube partly receives the back wheel.

However, the use of a complete wing profile as a cross section for a frame component increases the production cost because of the very small radius occurring on the profile trailing edge. Further, the alternative structure of the frame component with an absent back area improves the aerodynamic efficiency over a complete wing profile only when there is adjacent immediately therebehind a further bicycle part, for example the above-described back wheel.

SUMMARY

An object of the present invention is hence to state a component for bicycle frames having a suitable cross section which shows an improved aerodynamic efficiency even without a further bicycle part adjacent immediately therebehind, and meets the regulations of the International Cycling Union.

This object is achieved by a component for a bicycle frame according to the main claim. The dependent claims relate to preferred embodiments and developments of the invention.

As mentioned above, it is known to configure components for bicycle frames completely, or only a front side portion of such a component, as a wing profile, whereby in the latter case the front side portion of the component is described by a front side portion of the wing profile.

The component for a bicycle frame according to the invention comprises a wing profile front side portion and a back side portion which is configured convexly at least in certain portions.

The front side portion of the component is the area in which the outer side of the cross section, that is, the outer skin of the component, is described by a wing profile. The back side portion is the area in which the outer side of the cross section, that is, the outer skin of the component, deviates from the shape of a wing profile, that is, is not described by a wing profile.

The component has a longitudinal direction which, in the case of elongate tubes such as the seat tube and the down tube of a bicycle frame, coincides with the axis thereof. In general, the stated components possess a direction along which a cross section formed perpendicular thereto does not change, or changes only slightly. A cross section is understood for the purposes of the present print to be the section through the component in a given plane. In other words, the cross section does not change, or changes only minimally, with regard to shape, alignment and dimensions along the longitudinal direction of the component. In the cross-sectional plane perpendicular to the longitudinal direction of the component, the depth and the width of the component are measured, the depth being measured along the chord line of the wing profile underlying the front side portion, and the width perpendicular thereto. Thus, the longitudinal direction of the component and the chord line of the underlying wing profile span the so-called wing profile plane.

The component is arranged on, or intended for attachment to, the bicycle frame such that the front side portion of the component points in the travel direction, and the air stream—at least when the component is impinged by the air stream undisturbed—hits the leading edge of the wing profile. In other words, the travel direction lies in the wing profile plane of the front side portion of the component. Thus, the normal of the wing profile plane is perpendicular to the travel direction. The back side portion of the component is at the back in the travel direction.

The wing profile underlying the front side portion of the component is preferably configured symmetrically. Such a profile is described for example by a NACA profile with the code number 00XX. In such a symmetrical wing profile, the wing profile plane at the same time forms the symmetry plane of the front side portion of the component. Preferably, the entire component including the back side portion is constructed symmetrically.

In the simplest case, the component is arranged, or intended to be arranged, in the bicycle frame such that the chord line of the wing profile of the front side portion points in the travel direction. In other words, the longitudinal direction of the component is perpendicular to the travel direction, and the profile leading edge is perpendicular to the travel direction. Such an arrangement with respect to the travel direction is shown by approximately vertically or horizontally aligned components such as the head tube, the fork legs, the seat tube, the seat post and the handlebar cross-brace. In this case, the sectional plane spanned by the chord line of the wing profile of the front side portion and the normal of the plane of the wing profile—referred to hereinafter as the component sectional plane—and the sectional plane spanned by the travel direction and the normal of the wing profile plane of the wing profile of the front side portion—referred to hereinafter as the travel direction sectional plane—coincide substantially or precisely.

The component can also be arranged on a tilt in the travel direction, however, so that the travel direction still lies in the wing profile plane of the front side portion of the component, but chord line and travel direction are at a non-zero angle, and the longitudinal direction of the component and the travel direction are accordingly at a non-right angle. Such a tilted arrangement is shown for example by the down tube. In this case, the component sectional plane and the travel direction sectional plane diverge. The down tube is tilted from the vertical in the travel direction by an angle α for example.

In a preferred embodiment of the invention, the wing profile underlying the cross section of the front side portion in the travel direction sectional plane has a ratio of width to profile depth in the range between 1:3 and 1:14, particularly preferably between 1:9 and 1:14, for example 1:3, 1:4, 1:5, 1:6, 1:7, 1:8, 1:9, 1:10, 1:11, 1:12, 1:13 or 1:14, whereby each of the stated values can be a boundary of the stated value domain.

Preferably, the wing profile underlying the cross section of the front side portion of the component in the travel direction sectional plane is a NACA profile, particularly preferably a four-digit NACA profile, i.e. a NACA profile with a four-digit code number. Further, the NACA profile preferably possesses a code number in the range between 0007 and 0016, for example 0007, 0008, 0009, 0010, 0011, 0012, 0013, 0014, 0015 or 0016, whereby each of the stated single values can be a boundary of the stated value domain. The NACA profile 0007 possesses a ratio of total depth to total width of 14.3:1, and the NACA profile 0016 a corresponding ratio of 6.3:1.

Particularly preferably, the ratio of total depth to total width of the NACA profile underlying the cross section of the front side portion in the travel direction sectional plane is between 8:1 and 10:1, which corresponds approximately to NACA profiles with code numbers between 0010 and 0012.

Preferably, the depth of the front side portion of the component in the travel direction sectional plane is 10% to 60%, preferably 10% to 30%, of the total profile depth of the complete NACA profile underlying the front side portion in the travel direction sectional plane. Particularly preferably, the depth of the front side portion is 15% to 20% of the profile depth of the NACA profile, for example 15%, 16%, 17%, 18%, 19% or 20%, whereby each of the stated single values can be a boundary of the stated value domain.

Further, the depth of the front side portion in the travel direction sectional plane is preferably 70% to 95% of the depth of the total component in the travel direction sectional plane. Particularly preferably, the depth of the front side portion in the travel direction sectional plane is 80 to 90% of the depth of the total component in the travel direction sectional plane, for example 80%, 82%, 84%, 85%, 86%, 88% or 90%, whereby each of the stated single values can be a boundary of the stated value domain.

Accordingly, the depth of the back side portion in the travel direction sectional plane is 5% to 30% of the depth of the entire component in the travel direction sectional plane, and particularly preferably 10% to 20% of the depth of the component in the travel direction sectional plane, for example 10%, 12%, 14%, 15%, 16%, 18% or 20%, whereby each of the stated single values can be a boundary of the stated value domain.

In four-digit NACA profiles, the maximum profile thickness, that is, the rearward point of maximum thickness of the profile, is at 30% of the profile depth measured from the leading edge along the chord line. If the depth of the front side portion of the component in the travel direction sectional plane is 10% to 30% of the profile depth of the complete, underlying NACA profile in the travel direction sectional plane, the front side portion of the component has a width increasing steadily from the profile leading edge. Further, the gradient, that is, the change in width of the component along the chord line, decreases with increasing distance from the profile leading edge, and is smallest at the back end of the front side portion of the component both in the travel direction sectional plane and in the component sectional plane. The gradient at the back end of the front side portion of the component is smaller the closer the back end is to the point of maximum thickness of the underlying NACA profile. If the depth of the front side portion is 30% of the profile depth of the complete, underlying NACA profile in the travel direction sectional plane, the gradient is zero. The gradient at the back end of the front side portion of the component can preferably be neglected.

The back side portion of the component is configured in one piece with the front side portion. Back side portion and front side portion together form the total component, and the component is closed in cross section. In other words, the component has a closed, circumferential outer skin. On the outer skin of the component the transition between the front side portion and the back side portion is configured to be smooth, that is, the front end of the back side portion and the back end of the front side portion have the same width and the same gradient, that is, the same change in width of the component both along the chord line and along the travel direction.

Preferably, the back side portion of the component is configured, like the front side portion thereof, symmetrically with regard to the wing profile plane of the front side portion, so that back side portion and front side portion of the component have a common symmetry plane, and the total component is symmetrical.

The back side portion is preferably so configured in the travel direction sectional plane that the total depth of the component in the travel direction sectional plane is smaller than the depth of the complete wing profile underlying the front side portion in the travel direction sectional plane, which is favored by the back side portion being configured convexly at least in certain portions.

According to the invention, the cross section of the back side portion of the component in the travel direction sectional plane is configured convexly at least in certain portions, thereby obtaining an improved aerodynamic efficiency over a complete wing profile even without a further bicycle part being adjacent directly therebehind.

Preferably, the cross section of the front end of the back side portion in the travel direction sectional plane possesses a convex outer skin, and the back side portion possesses in a lateral area in the travel direction sectional plane an outer skin cross section which is described by a circular-arc segment with a given lateral radius of curvature in the travel direction sectional plane. The lateral radius of curvature in the travel direction sectional plane is 30% to 50% of the width of the component at the back end of the front side portion. Preferably, the lateral radius of curvature in the travel direction sectional plane is between 35% and 45% of the width of the component at the back end of the front side portion, being for example 35%, 37%, 39%, 40%, 41%, 43% or 45%, whereby the stated single values can be boundaries of the stated value domain. The lateral area of the back side portion is an outer, front area of the back side portion which is configured remotely from the wing profile plane and thus, in the case of a symmetrical structure of the component, from the symmetry plane of the component. The circular-arc segment having the lateral radius of curvature in the travel direction sectional plane preferably comprises the front end of the back side portion of the component.

If the maximum profile thickness of the profile underlying the front side portion in the travel direction sectional plane is behind the back end of the front side portion of the component in the travel direction sectional plane, the component has its greatest width in the area of the transition between front side portion and back side portion. If the gradient of the front side portion at the back end of the front side portion in the travel direction sectional plane is negligible, the component has its greatest width at the transition between front side portion and back side portion. Thus, a smooth transition between front side portion and back side portion can be realized with little effort. Through the convex configuration of the front end of the back side portion in the travel direction sectional plane, a further improved aerodynamic efficiency is attained.

Preferably, the lateral radius of curvature constitutes the smallest radius of curvature occurring on the back side portion in the travel direction sectional plane. In other words, the component does not show on the back side portion any place with an aerodynamically unfavorable edge for example, as would arise from simply "cutting off" the component at the back end of the front side portion perpendicular to the chord line.

In a preferred embodiment, the back side portion is configured convexly in a central area in the travel direction sectional plane and possesses a circular-arc segment with a given central radius of curvature there. The central radius of curvature is in the travel direction sectional plane between 50% and 100% of the width of the component at the back end of the front side portion. Particularly preferably, the central radius of curvature area is between 75% and 100% of the width of the component at the back end of the front side portion, being for example 75%, 80%, 85%, 90%, 95% or 100%, whereby the stated single values can be boundaries of the stated value domain.

The central area of the back side portion encloses the wing profile plane, whereby the area where the central area has a circular-arc segment in the travel direction sectional plane is preferably configured symmetrically with regard to the wing profile plane of the component. A large central radius of curvature yields a flat back side portion and thus a component with an accordingly small total depth.

In an especially preferred embodiment of the component according to the invention, the cross section of the back side portion in the travel direction sectional plane is configured continuously and completely convexly. This increases the aerodynamic efficiency of the component according to the invention. Even with such a completely convex configuration of the back side portion of the component, said portion can have different radii of curvature. The lateral radius of curvature is preferably smaller than the central radius of curvature here.

In an especially preferred embodiment of the component according to the invention, the cross section of the back side portion in the travel direction sectional plane is described completely by a circular-arc segment with a single radius of curvature constant over the entire back side portion. In this case, the lateral radius of curvature is equal to the central radius of curvature in the travel direction sectional plane. If the gradient of the component at the back end of the front side portion in the travel direction sectional plane is small, substantially zero and thus negligible, the radius of curvature of the cross section of the back side portion in the travel direction sectional plane is 50% of the width of the component at the back end of the front side portion, and the back side portion possesses a semi-circular cross section in the travel direction sectional plane.

In an especially preferred embodiment of the component according to the invention, said component further comprises a bottle holder which is attachable to the component or configured in one piece with the component. The bottle holder is attached to the back side portion of the component or constitutes the back side portion of the component. The bottle holder is a holder for a drinking bottle which is preferably of cylindrical configuration. The bottle holder has an interior recess for the drinking bottle, which is preferably of cylindrical configuration according to the drinking bottle, having a cylinder axis extending parallel to the longitudinal direction of the component. The bottle holder is preferably configured only in partial areas of the component in the longitudinal direction of the component and possesses a length, in the longitudinal direction of the component, which corresponds for example to half the height of the drinking bottle. Preferably, the component comprising the bottle holder is the down tube of the bicycle frame.

In a preferred embodiment, the cross section of a back area of the bottle holder in the component sectional plane has a circular-arc-segment-shaped outer skin, and the front area of the bottle holder is so configured that a smooth transition is created between the front side portion of the component and the bottle holder. The entire component with bottle holder has a smooth, continuous outer skin In a further preferred embodiment, the circular arc of the circular-arc-segment-shaped outer skin of the back area of the bottle holder in the component sectional plane has a radius which is greater than half the width of the back end of the front side portion of the component. The maximum width of the bottle holder is thus greater than the maximum width of the front side portion of the component. Accordingly, the front area of the bottle holder is configured concavely in the travel direction sectional plane and in the component sectional plane to create a smooth transition between the back end of the front side portion of the component and the back area of the bottle holder.

Further embodiment examples and advantages of the invention will hereinafter be explained by way of example with reference to the accompanying figures. The examples are preferred embodiments which in no way limit the invention. The shown figures are schematic representations which do not reflect the actual proportions but are intended to improve the clearness of the various embodiment examples.

BRIEF DESCRIPTION OF THE DRAWINGS

Specifically, the figures show.

DETAILED DESCRIPTION OF ILLUSTRATIVE EMBODIMENTS

Figure 1:
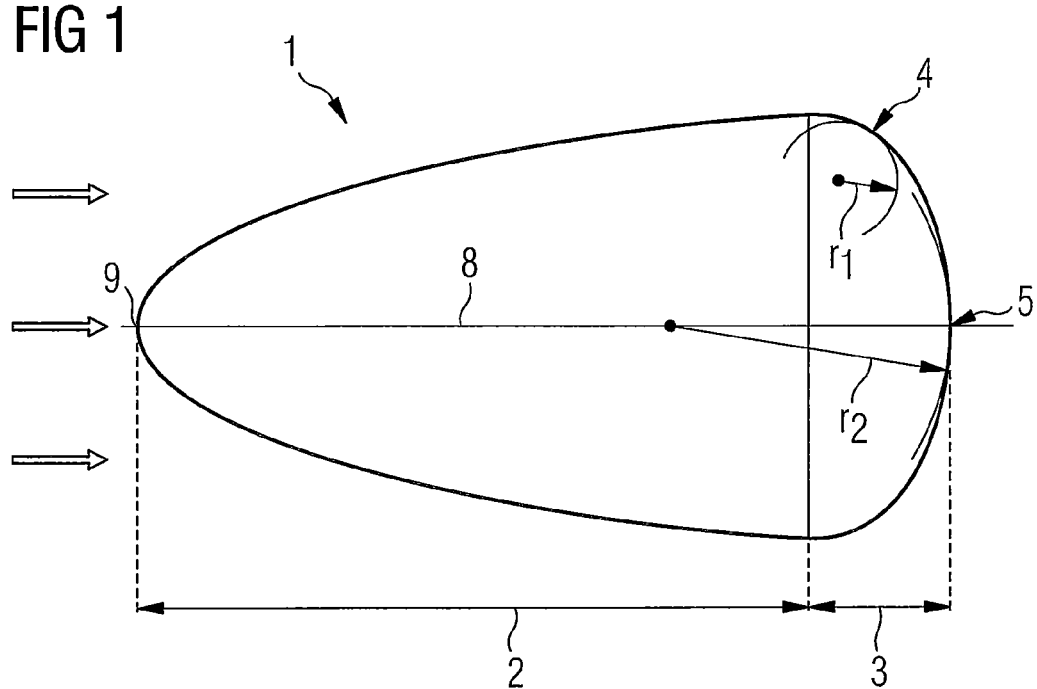
FIG. 1 shows a first embodiment example of a component.

In FIG. 1 there is depicted a first embodiment example of a component 1 for a bicycle frame. It shows a cross section through a down tube in the travel direction sectional plane, that is, in the plane spanned by the travel direction and the normal of the wing profile plane of the wing profile of the front side portion. The cross section shows a front side portion 2 whose outer skin is formed by the front area of a wing profile. The component 1 further comprises a back side portion 3 whose cross section in the travel direction sectional plane is configured completely convexly in the first embodiment example. The component has in the travel direction sectional plane a total length of 80 mm and a maximum width of 42 mm. The wing profile underlying the cross section of the front side portion 2 in the travel direction sectional plane is the NACA profile 0011 with a profile depth, that is, a chord length, of 400 mm and a maximum profile thickness of 44 mm. The foremost point of the component 1 is formed in the travel direction sectional plane by the profile leading edge 9 of the underlying NACA profile 0011. The front side portion 2 comprises in the travel direction sectional plane the front 17.5% of the underlying NACA profile and thus has a length of 70 mm. Because the front side portion 2 of the component 1 comprises less than 30% of the underlying four-digit NACA profile in the travel direction sectional plane, and the point of maximum profile thickness of the NACA profile is thus not part of the front side portion 2, the front side portion 2 has a steadily increasing width along the travel direction 8, reaching a maximum width of 42 mm at the back end of the front side portion 2 in the travel direction sectional plane. The back side portion 3 is smoothly adjacent at its front end to the back end of the front side portion 2, that is, at the transition between front side portion 2 and back side portion 3 the outer skin of front side portion 2 and back side portion 3 have the same width and a like gradient of component width across the travel direction 8.

In a non-depicted variant of the embodiment example, the depth of the front side portion is 30% of the profile depth of the entire, underlying NACA profile in the travel direction sectional plane. Accordingly, the gradient at the transition between front side portion 2 and back side portion 3 is zero, thereby attaining an especially high aerodynamic efficiency.

The back side portion 3 is configured completely convexly in the travel direction sectional plane and has in a lateral area 4 a circular-arc segment with a lateral radius of curvature $r_1$ of 15 mm. In a central area 5 the outer skin of the back side portion 3 likewise has in the travel direction sectional plane a circular-arc segment with a central radius of curvature $r_2$ of 25 mm. Because the gradient of the component width across the travel direction 8 at the transition between front side portion 2 and back side portion 3 is substantially zero, the component 1 has its greatest width at the transition between front side portion 2 and back side portion 3. The component is impinged symmetrically by the air stream on the profile leading edge 9, as indicated by the arrows in FIG. 1. Further, the embodiment example possesses a cross section that is symmetrical with regard to the travel direction 8. The component 1 is thus constructed symmetrically with regard to the wing profile plane of the wing profile underlying the front side portion in the travel direction sectional plane, said wing profile plane at the same time constituting the symmetry plane of the component.

The embodiment example depicted in FIG. 1 involves a down tube with a total length in the travel direction sectional plane of 80 mm. Other frame components such as top tube, head tube, seat tube, chain stay and seat stay, or components intended to be mounted on a bicycle frame such as handlebars, seat post or front fork, can also be configured in the same or a similar way. If the component 1 is for example a seat tube, it can have a total depth in the range between 30 mm and 45 mm, for example 30 mm, 35 mm, 40 mm or 45 mm In FIG. 2 there is depicted a second embodiment example of a component in cross section in the travel direction sectional plane. The second embodiment example is largely identical to the first embodiment example depicted in FIG. 1, and hereinafter only the differences between the embodiment examples will be dealt with. Instead of a convex central area 5, there is provided in the second embodiment example depicted in FIG. 2 in the travel direction sectional plane a level central area 6 with a level outer skin. In the lateral areas 4 there is also further provided in the travel direction sectional plane a convex circular-arc segment with a lateral radius of curvature $r_1$ of 15 mm.

In the third embodiment example depicted in FIG. 3 there is again provided in a lateral area 4 a circular-arc segment that is convex in the travel direction sectional plane, with a lateral radius of curvature $r_1$ of 15 mm. The central area 7 of the cross section of the back side portion 3 in the travel direction sectional plane is configured concavely, however, and has in the central area 7 in the travel direction sectional plane a circular-arc segment with a radius of curvature of 25 mm.

Otherwise the third embodiment example, like the second embodiment example above, is constructed identically to the first embodiment example.

Figure 2:
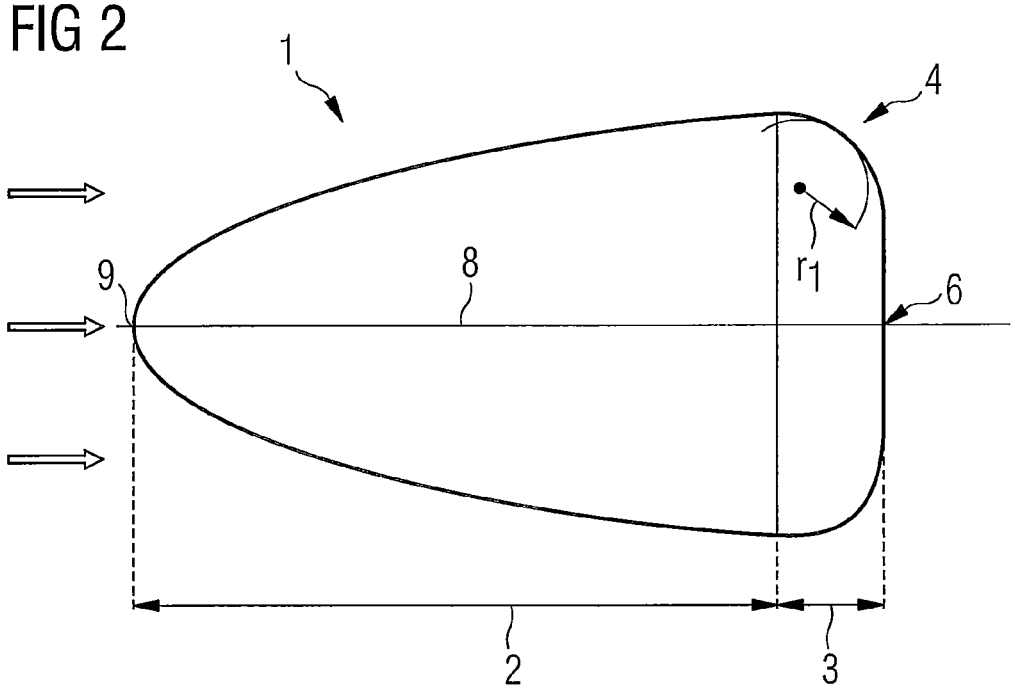
FIG. 2 shows a second embodiment example of a component.
Figure 3:
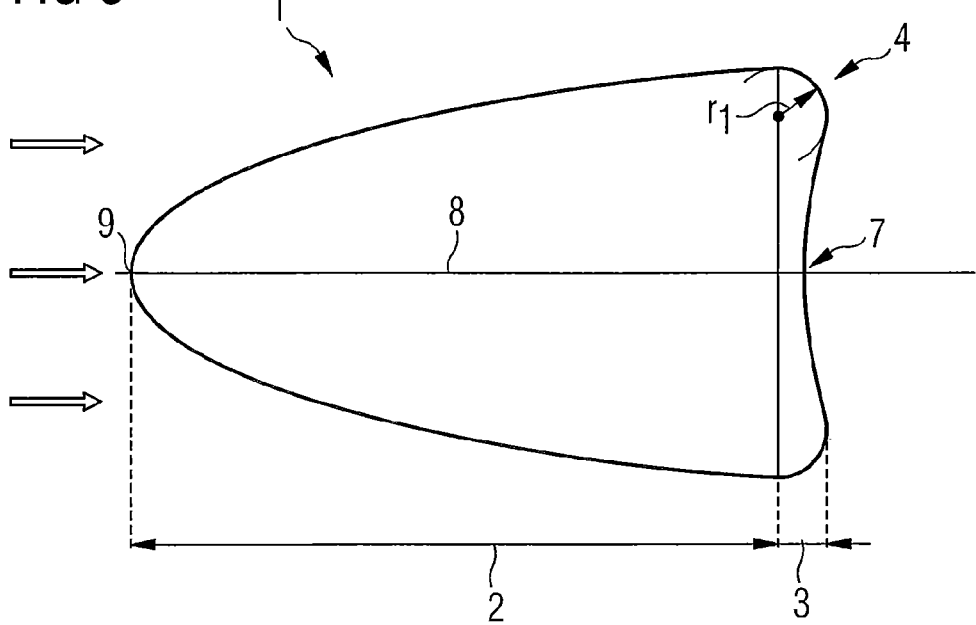
FIG. 3 shows a third embodiment example of a component.

In FIGS. 1 to 3 there is in each case depicted the cross section of the component 1 in the travel direction sectional plane. Information such as radii of curvature and other length information likewise relates to the travel direction sectional plane. If the component is arranged vertically in the bicycle frame, as is the case substantially with the head tube or the seat tube, the travel direction sectional plane is substantially identical to the component sectional plane which is spanned by the chord line of the wing profile of the front side portion and the normal of the wing profile plane of the wing profile and is in fixed relation to the component. If the component is tilted in the travel direction, however, as is the case with the down tube, the travel direction sectional plane and the component sectional plane diverge. Quite generally, the dimensions of the component must be provided smaller by a factor of $1/\cos\alpha$ in the direction of the chord line, which is perpendicular to the longitudinal direction of the component, than in the direction of the travel direction 8. In the transverse direction, that is, normally to the wing profile plane, however, the dimensions do not change through the tilting of the component. Accordingly, an elliptical cross section of the component must be provided in the component sectional plane in order for a circular arc-shaped cross section in the travel direction sectional plane to be obtained. At a tilting angle $\alpha$ of 45° the factor is $\sqrt{2}$ and there results for the first embodiment example a total depth of 56.6 mm along the chord line in order to realize the described total length of 80 mm along the travel direction. Accordingly, the front side portion possesses along the chord line a depth of 49.5 mm and is described approximately by a NACA profile with a code number of about 0008. As a result of a tilted arrangement of a component in the bicycle frame, the dimensions are provided shortened in the direction of the chord line of the wing profile underlying the front side portion. In other words, such tilted components have a greater width relative to their length in the component sectional plane than in the travel direction sectional plane. Accordingly, components whose cross section in the travel direction sectional plane already meets the regulations of the International Cycling Union fulfill these regulations in any case since the relevant dimensions are determined in the component sectional plane.

Using a fluid-dynamic simulation, the resistance coefficient of the embodiment examples shown in FIGS. 1 to 3 was computed at different lateral radii of curvature using the following formula:

$$F_x = \tfrac{1}{2}\rho S C_x V_x^2,$$

where $F_x$ is the resistance force, $\rho$ the density of the surrounding medium (air), S the impinged cross-sectional area, $C_x$ the resistance coefficient and $V_x$ the velocity of the flowing medium.

In the first embodiment example, the lowest resistance coefficient $C_x$ results at a lateral radius of curvature $r_1$ in the travel direction sectional plane of 15 mm. At a lateral radius of curvature $r_1$ of 10 mm and 5 mm there results a resistance coefficient $C_x$ elevated by 24% and 22%, respectively. At a constant lateral radius of curvature $r_1$ in the travel direction sectional plane of 15 mm, the embodiment example depicted in FIG. 1 shows the lowest resistance coefficient $C_x$, while the second and third embodiment examples depicted in FIG. 2 and FIG. 3 show resistance coefficients elevated by 8% and 22%, respectively. If the lateral radii of curvature $r_1$ are reduced in the second and third embodiment examples, there result even higher resistance coefficients $C_x$. In comparison to the first embodiment example with a lateral radius of curvature $r_1$ in the travel direction sectional plane of 15 mm, an elliptical standard frame component with a width of 52 mm and a depth of 46 mm shows a resistance coefficient $C_x$ elevated by 250%.

All in all, a large lateral radius of curvature $r_1$ in the travel direction sectional plane of 15 mm in the embodiment example thus contributes to a considerably elevated aerodynamic efficiency. The aerodynamic efficiency is increased further when the back side portion of the component is likewise configured convexly in a central area 5.

These considerations are based on Reynolds numbers in the range between 40000 and 100000.

Figure 4:
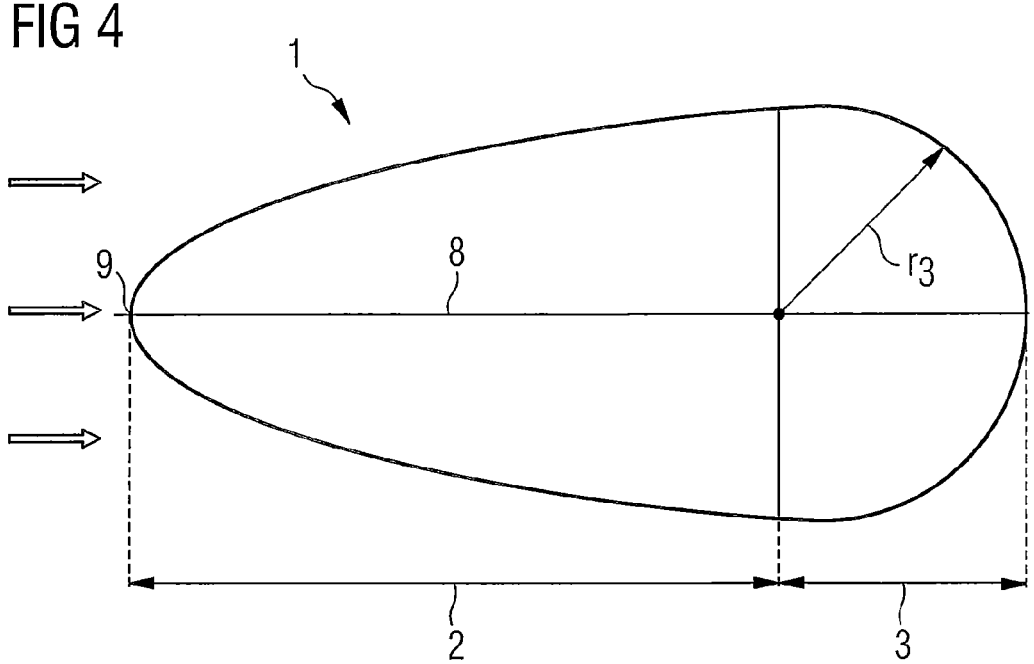
FIG. 4 shows a fourth embodiment example of a component.

In FIG. 4 there is depicted a fourth embodiment example of a component. It is configured continuously circular-arc-shaped with a constant radius of curvature in the back side portion 3 in the travel direction sectional plane. Lateral radius of curvature and central radius of curvature are thus identical, and the only radius of curvature $r_3$ occurring in the travel direction sectional plane is 21 mm, so that the back side portion 3 can be smoothly adjacent to the back end of the front side portion 2 with a width of 42 mm. Otherwise, the fourth embodiment example is again constructed identically to the first embodiment example.

Figure 5:
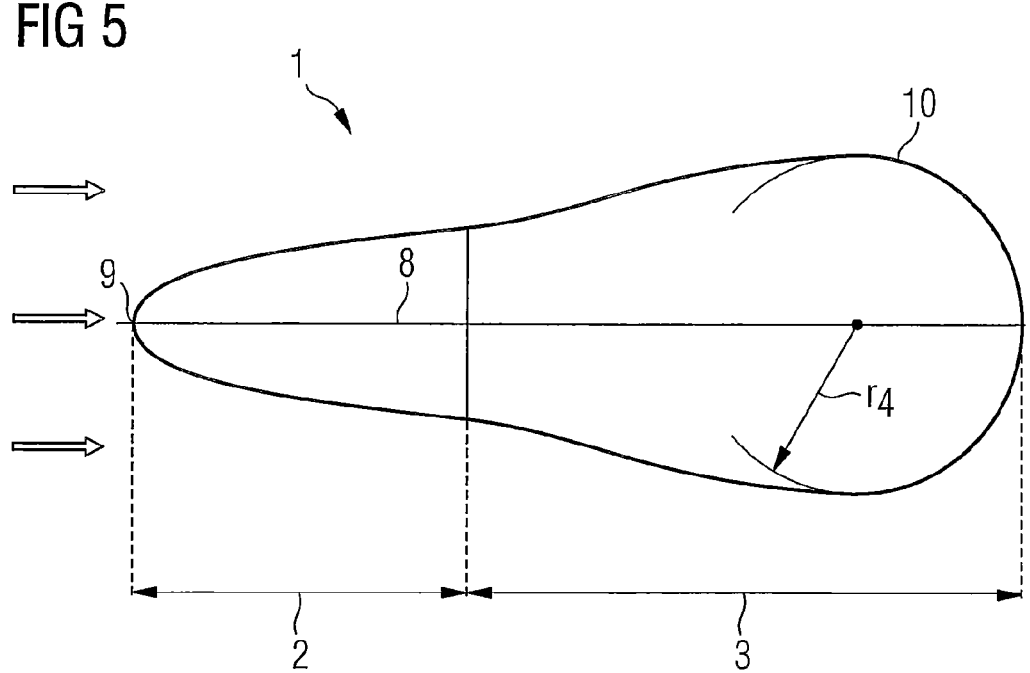
FIG. 5 shows an embodiment example with a bottle holder.

In FIG. 5 there is depicted a seat tube with a bottle holder 10 in cross section. With the seat tube, on account of its vertical arrangement in the bicycle frame, the component sectional plane and travel direction sectional plane coincide. In the travel direction sectional plane the front side portion 2 of the seat tube is constructed identically to the front side portion 2 of the down tube of the first embodiment example. The back side portion 3 comprises a back area which is configured as a holder 10 for a drinking bottle and whose outer skin is a circular-arc segment with a radius of curvature $r_4$ of approx. 40 mm. The component 1 possesses in the area of the bottle holder 10 a non-depicted cylindrical recess into which a cylindrical drinking bottle with a diameter of 75 mm can be inserted. The width of the back area of the back side portion 3 is greater, being approx. 80 mm, than the greatest width (42 mm) of the front side portion 2. Accordingly, the front area of the back side portion 3 of the component 1 is configured concavely at least in certain portions in order to guarantee a smooth transition between the front side portion 2 and the bottle holder 10. Like the above-described embodiment examples, the embodiment example depicted in FIG. 5 is also constructed symmetrically, that is, the outer skin of front side portion 2 and back side portion 3 with bottle holder 10 possesses a structure that is symmetrical with regard to the chord line and travel direction 8.

In an alternative, non-depicted embodiment example, the bottle holder is provided on the down tube. In this case, the back area of the back side portion 3 is configured circular-arc-shaped in the component sectional plane as described above, with a circular, cylindrical recess for the drinking bottle. In the travel direction sectional plane the back area of the back side portion 3 is configured accordingly elliptically in cross section.

I claim:

1. A component for a bicycle frame comprising a wing profile front side portion and a back side portion that is convex at least in certain portions, wherein, upon the attachment in the bicycle frame, the depth of the front side portion of the component in a sectional plane, spanned by a travel direction and a normal of the wing profile plane of the wing profile front side portion, is 10% to 60% of the profile depth of the wing profile and 70% to 95% of a depth of the component.

2. The component according to claim 1, wherein the wing profile underlying the front side portion is symmetrical with regard to a wing profile plane.

3. The component according to claim 2, wherein the entire component is configured symmetrically with regard to the wing profile plane.

4. The component according to claim 2, which is configured such that upon attachment in the bicycle frame, the wing profile underlying a cross section of the front side portion in a sectional plane spanned by a travel direction and a normal of the wing profile plane of the wing profile front side portion has a ratio of width to profile depth in a range between 1:3 and 1:14.

5. The component according to claim 4, wherein the ratio of width to profile depth is in a range between 1:9 and 1:14.

6. The component according to claim 5, wherein the wing profile in the sectional plane is a NACA profile.

7. The component according to claim 6, wherein the NACA profile comprises a four-digit NACA profile.

8. The component according to claim 7, wherein the four-digit NACA profile comprises a code number between 0007 and 0016.

9. The component according to claim 1, wherein the depth of the front side portion of the component in the sectional plane is about 10% to about 30% of a profile depth of the wing profile.

10. The component according to claim 9, wherein the depth of the front side portion of the component in the sectional plane is about 15% to about 20% of the profile depth of the wing profile.

11. The component according to claim 1, wherein the depth of the front side portion of the component in the sectional plane is 80% to 90%, of the depth of the component.

12. The component according to claim 4, wherein the back side portion in the sectional plane is configured convexly in a lateral area, and wherein the lateral area comprises a lateral radius of curvature ($r_1$) between 30% and 50% of a width of the component at the back end of the front side portion.

13. The component according to claim 12, wherein the lateral radius of curvature ($r_1$) is between about 35% and about 45% of the width of the component at the back end of the front side portion.

14. The component according to claim 4, wherein the back side portion in the sectional plane is configured convexly in a central area, and wherein the central area comprises a central radius of curvature ($r_2$) between 50% and 100% of a width of the component at the back end of the front side portion.

15. The component according to claim 14, wherein the central radius of curvature ($r_2$) is between 75% and 100% of the width of the component at the back end of the front side portion.

16. The component according to claim 4, wherein the back side portion in the sectional plane is configured completely convexly.

17. The component according to claim 4, wherein:
the back side portion in the sectional plane is configured convexly in a lateral area, and wherein the lateral area comprises a lateral radius of curvature ($r_1$);
the back side portion in the sectional plane is configured convexly in a central area, and wherein the central area comprises a central radius of curvature ($r_2$); and
wherein in the sectional plane the lateral radius of curvature ($r_1$) is smaller than the central radius of curvature ($r_2$).

18. The component according to claim 4, wherein the back side portion in the sectional plane has a constant radius of curvature ($r_3$) of half a width of the component at the back end of the front side portion.

19. The component according to claim 4, wherein a depth of the back side portion in the sectional plane is 5% to 30% of a depth of the component.

20. The component according to claim 19, wherein the depth of the back side portion in the sectional plane is 10% to 20% of the depth of the component.

21. The component according to claim 1, further comprising a bottle holder that is attachable to the component.

22. The component according to claim 1, further comprising a bottle holder that is configured in one piece with the component.

23. The component according to claim 22, wherein the bottle holder comprises the back side portion.

24. The component according to claim 23, wherein in a sectional plane spanned by the chord line of the wing profile of the front side portion and the normal of the wing profile plane, the cross section of a back area of the bottle holder comprises a circular-arc-segment-shaped outer skin, and a front area of the bottle holder is so configured that a smooth transition is created between the front side portion and the back area of the bottle holder.

25. The component according to claim 24, wherein the circular-arc-segment-shaped outer skin has a radius ($r_4$) which is greater than half the width of a back end of the front side portion.

* * * * *